US011741932B2

(12) United States Patent
John et al.

(10) Patent No.: US 11,741,932 B2
(45) Date of Patent: Aug. 29, 2023

(54) UNMANNED AIRCRAFT AND INFORMATION PROCESSING METHOD

(71) Applicant: Panasonic Intellectual Property Management Co., Ltd., Osaka (JP)

(72) Inventors: Stephen William John, Nara (JP); Toshiyuki Matsumura, Osaka (JP); Kazunobu Konishi, Osaka (JP); Katsuhiko Asai, Nara (JP); Shunsuke Kuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 24 days.

(21) Appl. No.: 17/568,168

(22) Filed: Jan. 4, 2022

(65) Prior Publication Data
US 2022/0122576 A1   Apr. 21, 2022

Related U.S. Application Data

(63) Continuation of application No. PCT/JP2020/022697, filed on Jun. 9, 2020.

(30) Foreign Application Priority Data

Jul. 23, 2019  (JP) .................................. 2019-135096

(51) Int. Cl.
*G10K 11/178* (2006.01)
*B64C 27/20* (2023.01)
*B64C 39/02* (2023.01)
*G05D 1/08* (2006.01)
(Continued)

(52) U.S. Cl.
CPC ........ *G10K 11/17823* (2018.01); *B64C 27/20* (2013.01); *B64C 39/024* (2013.01); *G05D 1/0808* (2013.01); *H04R 1/323* (2013.01); *H04R 1/326* (2013.01); *B64C 2220/00* (2013.01); *B64U 30/20* (2023.01);
(Continued)

(58) Field of Classification Search
None
See application file for complete search history.

(56) References Cited

U.S. PATENT DOCUMENTS

| 2011/0147533 A1 | 6/2011 | Goossen et al. |
| 2016/0063987 A1 | 3/2016 | Xu et al. |
| 2017/0220036 A1 | 8/2017 | Visser et al. |

(Continued)

FOREIGN PATENT DOCUMENTS

| JP | 2011-126517 | 6/2011 |
| JP | 2017-502568 | 1/2017 |

(Continued)

OTHER PUBLICATIONS

International Search Report dated dJul. 14, 2020 in International (PCT) Application No. PCT/JP2020/022697.

*Primary Examiner* — Kenny H Truong
(74) *Attorney, Agent, or Firm* — Wenderoth, Lind & Ponack, L.L.P.

(57) ABSTRACT

An unmanned aircraft includes: rotor blades; a duct that shrouds the rotor blades and through which airflow generated by rotation of the rotor blades passes; and a processor that controls rotation of the rotor blades. The height to width ratio of an inner space of the duct in which the rotor blades are shrouded is at least 0.5.

14 Claims, 11 Drawing Sheets

(51) Int. Cl.
  *H04R 1/32* (2006.01)
  *B64U 30/20* (2023.01)
(52) U.S. Cl.
  CPC ............... *G10K 2210/1281* (2013.01); *G10K 2210/3046* (2013.01); *H04R 2410/05* (2013.01); *H04R 2499/13* (2013.01)

(56) References Cited

U.S. PATENT DOCUMENTS

| | | |
|---|---|---|
| 2019/0039724 A1 | 2/2019 | Konishi et al. |
| 2019/0039725 A1 | 2/2019 | Konishi et al. |
| 2019/0106204 A1 | 4/2019 | Konishi et al. |
| 2019/0106205 A1 | 4/2019 | Konishi et al. |
| 2019/0108827 A1 | 4/2019 | Konishi et al. |

FOREIGN PATENT DOCUMENTS

| | | | | |
|---|---|---|---|---|
| JP | 2019-28436 | 2/2019 | | |
| JP | 2019-505047 | 2/2019 | | |
| JP | 2019-70787 | 5/2019 | | |
| WO | 2016/029469 | 3/2016 | | |
| WO | 2017/131845 | 8/2017 | | |
| WO | WO-2018103203 A1 * | 6/2018 | ............. | B64C 27/08 |

* cited by examiner

UNMANNED AIRCRAFT AND INFORMATION PROCESSING METHOD

CROSS REFERENCE TO RELATED APPLICATION(S)

This is a continuation application of PCT International Application No. PCT/JP2020/022697 filed on Jun. 9, 2020, designating the United States of America, which is based on and claims priority of Japanese Patent Application No. 2019-135096 filed on Jul. 23, 2019. The entire disclosures of the above-identified applications, including the specifications, drawings, and claims are incorporated herein by reference in their entirety.

FIELD

The present disclosure relates to an unmanned aircraft and an information processing method.

BACKGROUND

Patent Literature (PTL) 1 discloses an unmanned aerial vehicle that performs processing for removing background noise from audio data picked up by a background microphone.

CITATION LIST

Patent Literature

PTL 1: Japanese Unexamined Patent Application Publication (Translation of PCT Application) No. 2017-502568

SUMMARY

Technical Problem

Unfortunately, with the invention disclosed in PTL 1, it is difficult to directly reduce the influence of noise generated by the unmanned aircraft on the sound processing target. For example, background noise generated by the unmanned aerial vehicle is not removed.

In view of this, the present disclosure has an object to provide an unmanned aircraft and an information processing method that can directly reduce the influence of noise generated by the unmanned aircraft on the sound processing target.

Solution to Problem

An unmanned aircraft according to the present disclosure includes: rotor blades; a duct that shrouds the rotor blades and through which airflow generated by rotation of the rotor blades passes; and a processor that controls rotation of the rotor blades. The ratio of the height to the width of an inner space of the duct in which the rotor blades are shrouded is at least 0.5.

These general or specific aspects may be implemented as a system, a method, an integrated circuit, a computer program, or a computer-readable recording medium such as a CD-ROM, or any combination thereof.

Advantageous Effects

The unmanned aircraft and the information processing method according to the present disclosure can directly reduce the influence of noise generated by the unmanned aircraft on the sound processing target.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
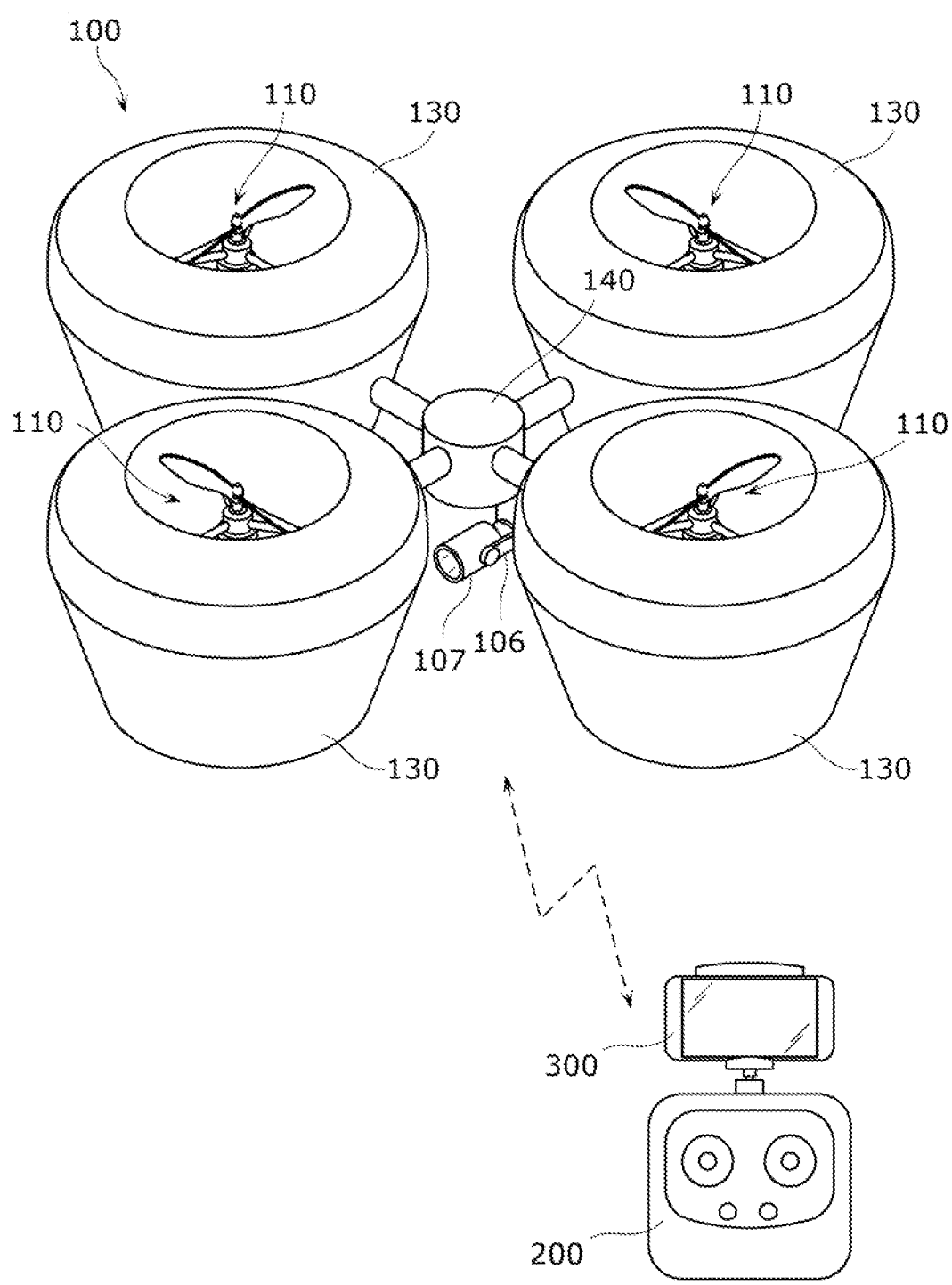
FIG. 1 is an external view of an unmanned aircraft and a controller according to an embodiment of the present disclosure.

Underlying Knowledge Forming Basis of Present Disclosure

An unmanned aircraft, such as the one in PTL 1, produces thrust for flight by driving the rotor blades to generate airflow. The unmanned aircraft therefore generates noise due to the wind noise of the rotor blades. In such an unmanned aircraft, by, for example, performing beamforming on a plurality of microphone signals of sound picked up by a plurality of microphone elements, compared to sound from a specific direction of the unmanned aircraft, it is possible to reduce sound from other directions. This in turn makes it possible to increase the signal to noise (SN) ratio of the target sound to noise, which indicates the quality of the target sound.

However, the target sound might not be recorded with sufficiently high quality because the unmanned aircraft generates noise exceeding a certain level. For example, when the sound source is a person and the sound of the person's voice is the target sound, since the unmanned aircraft generates noise when it approaches the person, the unmanned aircraft consequently emits noise that exceeds a certain level to the person. Therefore, when the unmanned aircraft is used to record the sound of a person's voice, it may cause discomfort to or frighten the person.

Similarly, when sound is output to a person from a loudspeaker included in the unmanned aircraft, the quality of the sound output from the loudspeaker might not be sufficiently high enough for output to a person because of the noise generated by the unmanned aircraft. Moreover, when attempting to output sound from the loudspeaker to a person at a sufficiently high quality, since the unmanned aircraft generates noise when it approaches the person, the same problem that arises when recording sound arises when outputting sound, too.

As described above, with conventional techniques, it is unfortunately difficult to directly reduce the influence of noise generated by the unmanned aircraft on the sound processing target.

In order to overcome such a problem, an unmanned aircraft according to one aspect of the present disclosure includes: rotor blades; a duct that shrouds the rotor blades and through which airflow generated by rotation of the rotor blades passes; and a processor that controls rotation of the rotor blades. The ratio of the height to the width of an inner space of the duct in which the rotor blades are shrouded is at least 0.5.

With this, since the rotor blades of the unmanned aircraft are shrouded by a duct having an inner space with a height to width ratio of at least 0.5, a quiet area in which the noise level generated by the rotor blades is lower than other areas can be formed around the duct. Accordingly, the unmanned aircraft can obtain sufficiently high quality sound processing results since the unmanned aircraft can reduce the influence of noise generated by the unmanned aircraft on the sound processing results by, for example, executing sound processing related to the sound processing device using the quiet area. Moreover, when the sound processing target of the sound processing device is a person, the unmanned aircraft can reduce the level of noise emitted to the person by executing sound processing using the quiet area. It is therefore possible to reduce discomfort or fear felt by the person when using the unmanned aircraft to execute the sound processing with respect to a person. In this way, the unmanned aircraft can directly reduce the influence of noise generated by the unmanned aircraft on the sound processing target, one example of which is a person.

The width of the inner space may be at least 140 mm and at most 280 mm.

With this, since the rotor blades of the unmanned aircraft are shrouded by a duct having an inner space with a width that is at least 140 mm and at most 280 mm and a height to width ratio of at least 0.5, a quiet area in which the noise level generated by the rotor blades is lower than other areas can be formed around the duct.

The unmanned aircraft may further include a microphone or a loudspeaker. A sound pickup direction of the microphone or a sound output direction of the loudspeaker may be set to a direction toward a quiet area, the quiet area being relative to a first noise generated by rotation of the rotor blades and dependent on the ratio.

Since this enables the recording of sound from the quiet area using the microphone, the influence of noise generated by the unmanned aircraft on the recorded sound can be reduced. The target sound can therefore be recorded with sufficiently high quality. Similarly, since this enables the output of sound from the loudspeaker toward the quiet area, the influence of noise generated by the unmanned aircraft on the sound output by the loudspeaker can be reduced. Sound can therefore be output from the loudspeaker to a person with sufficiently high quality.

The unmanned aircraft may further include a mechanism that adjusts the ratio of the duct.

This makes it possible to change the position or size of the quiet area formed around the duct by adjusting the ratio using the mechanism.

The mechanism may include a mechanism that adjusts the height of the inner space of the duct.

Accordingly, the mechanism can adjust the ratio by adjusting the height of the inner space of the duct.

The unmanned aircraft may further include a sound processing device. The processor may execute sound processing related to the sound processing device based on a quiet area, the quiet area being relative to a first noise generated by rotation of the rotor blades and dependent on the ratio.

With this, since the sound processing related to the sound processing device is executed based on the quiet area that is dependent on the ratio of the duct, it is possible to directly reduce the influence of noise generated by the unmanned aircraft on the sound processing target.

The processor may obtain a position of a sound processing target of the sound processing device, and control at least one of a position and an attitude of the unmanned aircraft to include the sound processing target in the quiet area.

Since this enables at least one of the position and the attitude of the unmanned aircraft to be controlled to cause the quiet area to overlap the sound processing target, it is possible to effectively reduce the influence of noise generated by the unmanned aircraft on the sound processing results. Moreover, when the sound processing target of the sound processing device is a person, the unmanned aircraft can reduce the level of noise emitted to the person by causing the quiet area to overlap the sound processing target. It is therefore possible to reduce discomfort or fear felt by the person from the unmanned aircraft, and directly reduce the influence of the noise generated by the unmanned aircraft on the person.

The sound processing device may be a microphone. The sound processing target may be a sound source to be recorded by the microphone. The processor may control at least one of a position and an attitude of the microphone to include the sound source in a sound pickup area of the microphone and to cause the sound pickup area to overlap the quiet area.

Since this enables the recording of sound from the quiet area using the microphone, the influence of noise generated by the unmanned aircraft on the recorded sound can be reduced. The target sound can therefore be recorded with sufficiently high quality. Moreover, when the sound source is a person, the unmanned aircraft can reduce the level of noise emitted to the person by causing the quiet area to overlap the person. It is therefore possible to reduce discomfort or fear felt by the person from the unmanned aircraft, and directly reduce the influence of the noise generated by the unmanned aircraft on the person.

The sound processing device may be a microphone. A sound processing target of the sound processing device may be a sound source to be recorded by the microphone. The processor may obtain target sound characteristic information including a characteristic of a sound generated by the sound source or sound correlation information correlated with a characteristic of the sound, and identify the quiet area according to the ratio and the target sound characteristic information.

Since this enables sound to be recorded by a microphone by utilizing a quiet area identified according to the ratio of the duct and the target sound characteristic information, it is possible to directly reduce the influence of sound generated by the unmanned aircraft on the sound processing target.

The processor may obtain noise characteristic information including a characteristic of the first noise or noise correlation information correlated with a characteristic of the first noise, and identify the quiet area according to the ratio and the noise characteristic information.

Since this enables the sound processing to be executed using a quiet area identified according to the ratio of the duct and the noise characteristic information, when the sound processing target is a person, it is possible to effectively reduce the level of noise emitted to the person. Therefore, when the unmanned aircraft is used to execute the sound processing with respect to a person, it is possible to reduce discomfort or fear felt by the person from the unmanned aircraft, and directly reduce the influence of the noise generated by the unmanned aircraft on the person.

The processor may obtain a position of a sound processing target of the sound processing device and notify the sound processing target to enter the quiet area.

Since this makes it possible to notify the sound processing target so as to cause the quiet area to overlap the sound processing target, it is possible to effectively reduce the influence of noise generated by the unmanned aircraft on the sound processing results. Moreover, when the sound processing target of the sound processing device is a person, the unmanned aircraft can reduce the level of noise emitted to the person by causing the quiet area to overlap the sound processing target. It is therefore possible to reduce discomfort or fear felt by the person from the unmanned aircraft, and directly reduce the influence of the noise generated by the unmanned aircraft on the person.

The processor may obtain a position of a sound processing target of the sound processing device, obtain a movement instruction for moving the unmanned aircraft, and control at least one of a position and an attitude of the unmanned aircraft to include the sound processing target of the sound processing device in the quiet area while moving the unmanned aircraft based on the movement instruction.

This makes it easy to move the unmanned aircraft while keeping the quiet area overlapped with the sound processing target, even when the sound processing target is moving. Accordingly, it is possible to effectively reduce the influence of noise generated by the unmanned aircraft on the sound processing results. Moreover, when the sound processing target of the sound processing device is a person, by causing the quiet area to overlap the sound processing target, the unmanned aircraft can easily maintain a state in which the level of noise emitted to the person is reduced. It is therefore possible to reduce discomfort or fear felt by the person from the unmanned aircraft, and directly reduce the influence of the noise generated by the unmanned aircraft on the person.

The sound processing device may be a loudspeaker. A sound processing target of the sound processing device may be a sound output target. The processor may obtain a characteristic of a second noise coming from a position of the sound output target, and cause the loudspeaker to output, toward the quiet area, sound that reduces the second noise based on the characteristic of the second noise.

With this, it is possible for the unmanned aircraft to reduce the influence of noise generated by the unmanned aircraft on the sound output from the loudspeaker by outputting, from the loudspeaker toward the quiet area, sound that reduces the second noise coming from the position of the sound output target. Therefore, the second noise coming from the position of the sound output target can be effectively reduced, and the influence of noise generated by the unmanned aircraft on the sound output target can be directly reduced.

The unmanned aircraft may further include a mechanism that adjusts the ratio. The processor may obtain a position of a sound processing target of the sound processing device and control the mechanism to adjust the ratio to include the sound processing target in the quiet area.

Since this makes it possible to adjust the ratio of the duct so as to cause the quiet area to overlap the sound processing target, it is possible to effectively reduce the influence of noise generated by the unmanned aircraft on the sound processing results. Moreover, when the sound processing target of the sound processing device is a person, the unmanned aircraft can reduce the level of noise emitted to the person by causing the quiet area to overlap the sound processing target. It is therefore possible to reduce discomfort or fear felt by the person from the unmanned aircraft, and directly reduce the influence of the noise generated by the unmanned aircraft on the person.

An information processing method according to one aspect of the present disclosure is a method executed by a computer, and includes: obtaining a quiet area relative to a first noise generated by rotation of rotor blades included in an unmanned aircraft, the quiet area being dependent on the ratio of the height to the width of an inner space of a duct that shrouds the rotor blades and through which airflow generated by rotation of the rotor blades passes; and executing sound processing related to a sound processing device included in the unmanned aircraft, based on the quiet area.

With this, since the sound processing related to the sound processing device is executed based on the quiet area that is dependent on the ratio of the duct, it is possible to effectively reduce the influence of noise generated by the unmanned aircraft on the sound processing results.

These general or specific aspects may be implemented as a system, a method, an integrated circuit, a computer program, or a computer-readable recording medium such as a CD-ROM, or any combination thereof.

Hereinafter, the unmanned aircraft according to one aspect of the present invention will be described in detail with reference to the figures.

Each embodiment described below shows a specific example of the present invention. The numerical values, shapes, materials, elements, the arrangement and connection of the elements, steps, order of the steps, etc., indicated in the following embodiments are mere examples, and therefore do not intend to limit the present invention. Accordingly, among elements in the following embodiments, those not recited in any of the broadest, independent claims are described as optional elements.

[Embodiment]

Hereinafter, an embodiment will be described with reference to FIG. 1 through FIG. 10.

[Configuration]

Figure 2:
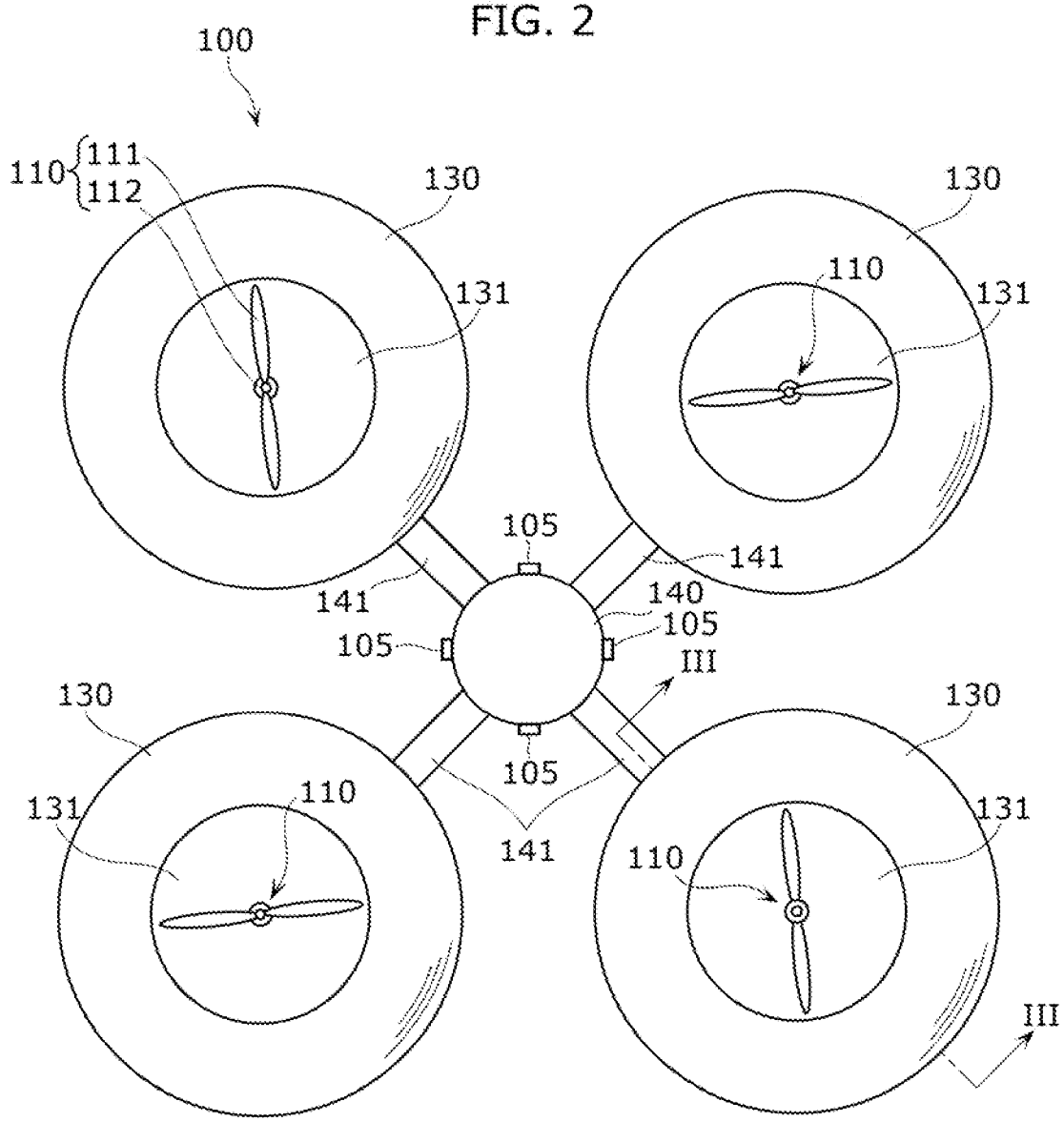
FIG. 2 is a plan view of the unmanned aircraft according to an embodiment of the present disclosure from above.

FIG. 1 is an external view of an unmanned aircraft and a controller according to an embodiment of the present disclosure. FIG. 2 is a plan view of the unmanned aircraft according to an embodiment of the present disclosure from above.

As illustrated in FIG. 1, unmanned aircraft 100 receives an operation signal from controller 200 in response to operation of controller 200 by a user, and flies according to the received operation signal. While flying, unmanned aircraft 100 may capture images using camera 107 included in unmanned aircraft 100 in accordance with the received operation signal. The image data captured by camera 107 may be transmitted to mobile terminal 300, which will be described later.

Controller 200 receives an operation from the user and transmits an operation signal corresponding to the received operation to unmanned aircraft 100. Controller 200 may also hold mobile terminal 300, which includes a display. One example of mobile terminal 300 is a smartphone.

Portable terminal 300 receives, from unmanned aircraft 100, image data captured by camera 107 included in unmanned aircraft 100, and displays the received image data in real time, for example.

This allows the user to change the flight state of unmanned aircraft 100, which is at least one of the position and the attitude of unmanned aircraft 100 in flight, by operating controller 200 while checking the image data captured by camera 107 included in unmanned aircraft 100 in real time using mobile terminal 300. With this, the user can freely change the imaging area of camera 107 included in unmanned aircraft 100.

Unmanned aircraft 100 includes four generators 110, four ducts 130, body 140, and four arms 141.

Each of the four generators 110 produces a force that propels unmanned aircraft 100. More specifically, each of the four generators 110 produces a force that enables unmanned aircraft 100 to fly by generating airflow. Each of the four generators 110 includes rotor blades 111 that generate airflow by rotating and actuator 112 that rotates rotor blades 111. The axis of rotation of rotor blades 111 and actuator 112 is approximately vertical. Actuator 112 generates an airflow from above rotor blades 111 to below rotor blades 111 by rotating rotor blades 111 about the axis of rotation. With this, each of the four generators 110 produces thrust that lifts unmanned aircraft 100 upward and produces a force that enables unmanned aircraft 100 to fly. Actuator 112 is, for example, a motor that rotates rotor blades 111 about the axis of rotation.

The four generators 110 are arranged at 90 degree intervals about body 140 in a view of unmanned aircraft 100 from above. In other words, the four generators 110 are arranged in an annular arrangement so as to surround body 140.

Although rotor blades 111 of each of the four generators 110 form a single propeller in the illustrated example, rotor blades 111 may form two contra-rotating, coaxial propellers that rotate in opposite directions. Moreover, the number of generators 110 may be less than four or more than five, as long as the thrust produced enables unmanned aircraft 100 to fly.

Figure 3:
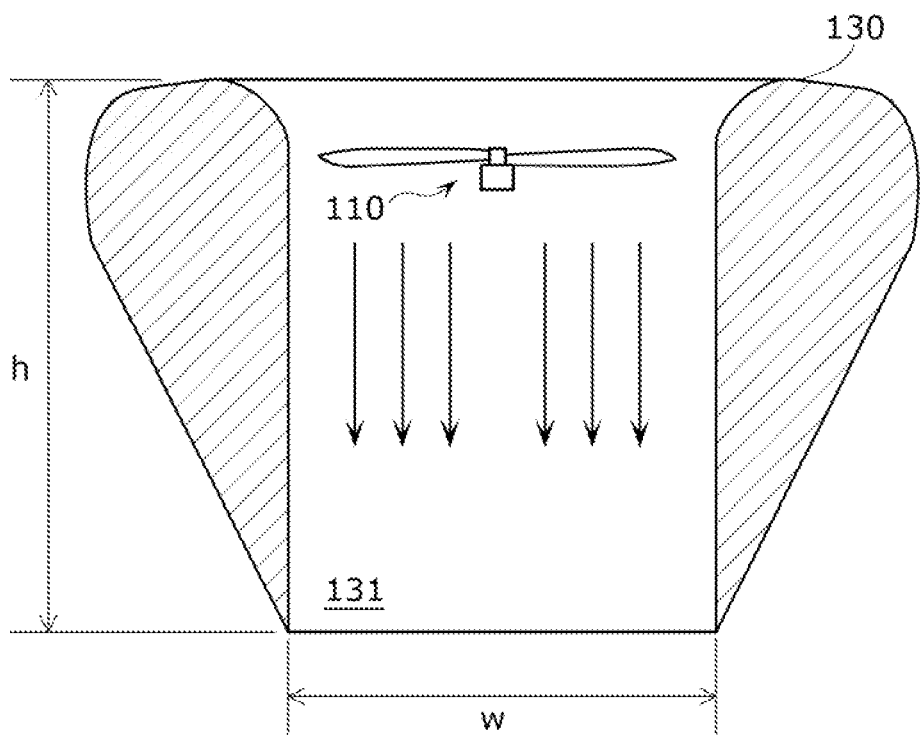
FIG. 3 illustrates a cross section of the unmanned aircraft taken along line III-III in FIG. 2.

FIG. 3 illustrates a cross section of the unmanned aircraft taken along line III-III in FIG. 2. In other words, FIG. 3 illustrates a cross section of one generator 110 and the duct 130 corresponding to the one generator 110 in a plane passing through the axis of rotation of rotor blades 111.

Four ducts 130 respectively corresponding to the four generators 110 are provided. Each of the four ducts 130 is positioned to cover the lateral sides of a corresponding generator 110, i.e., positioned to cover the sides in a direction orthogonal to the axis of rotation of rotor blades 111 of a corresponding generator 110. With this, the four ducts 130 respectively surround rotor blades 111 of the four generators 110 and allow airflow generated by the rotation of rotor blades 111 to pass therethough. For example, each of the four ducts 130 covers lateral sides of a corresponding generator 110 over the length the generator 110 along the axis of rotation. In other words, each of the four ducts 130 defines a cylindrical inner space 131 which accommodates a generator 110 and vertically penetrates the duct 130.

Here, the ratio (h/w) of the height (h) to the width (w) of inner space 131 is preferably at least 0.5, for example. The width of inner space 131 is preferably at least 140 millimeters (mm) and at most 280 mm. The reasoning will be discussed later with reference to FIG. 4.

Each of the four ducts 130 is shaped to decrease in thickness in the downstream direction of the airflow generated by a corresponding generator 110. More specifically, each of the four ducts 130 is shaped such that the outer surface of the duct 130 approaches the cylindrical inner surface of the duct 130 in the downstream direction of the airflow generated by a corresponding generator 110. In other words, the downstream end of each of the four ducts 130, which is the end in the downstream direction of the airflow generated by a corresponding generator 110, is pointed.

The upstream end of the inner surface of duct 130 has a rounded shape. More specifically, the upstream end is shaped such that the inner diameter of duct 130 tapers in the direction of the airflow. This makes it easier for air to enter inner space 131 of duct 130, improving flight performance. This also makes it possible to reduce the weight of duct 130 and thus unmanned aircraft 100. Note that the upstream end may have a linear shape parallel to the direction of airflow.

Body 140 is, for example, a cylindrical box-shaped component, i.e., enclosure that houses electronic devices such as a processor, memory, a battery, and various sensors. The shape of body 140 is not limited to a cylindrical shape; body 140 may be any other shape such as a quadrangular prism. Microphones 105, gimbal 106, and camera 107 are provided on the outside of body 140. For example, microphones 105 are respectively positioned on the outside of body 140 at locations between two adjacent ones of the four generators 110 arranged to surround the body 140.

The four arms 141 are components that connect body 140 to the four ducts 130. Each of the four arms 141 has one end fixed to body 140 and the other end fixed to a corresponding one of the four ducts 130.

Next, the reason it is preferable to set the ratio h/w of inner space 131 to at least 0.5 will be explained with reference to FIG. 4 through FIG. 6.

Figure 4:
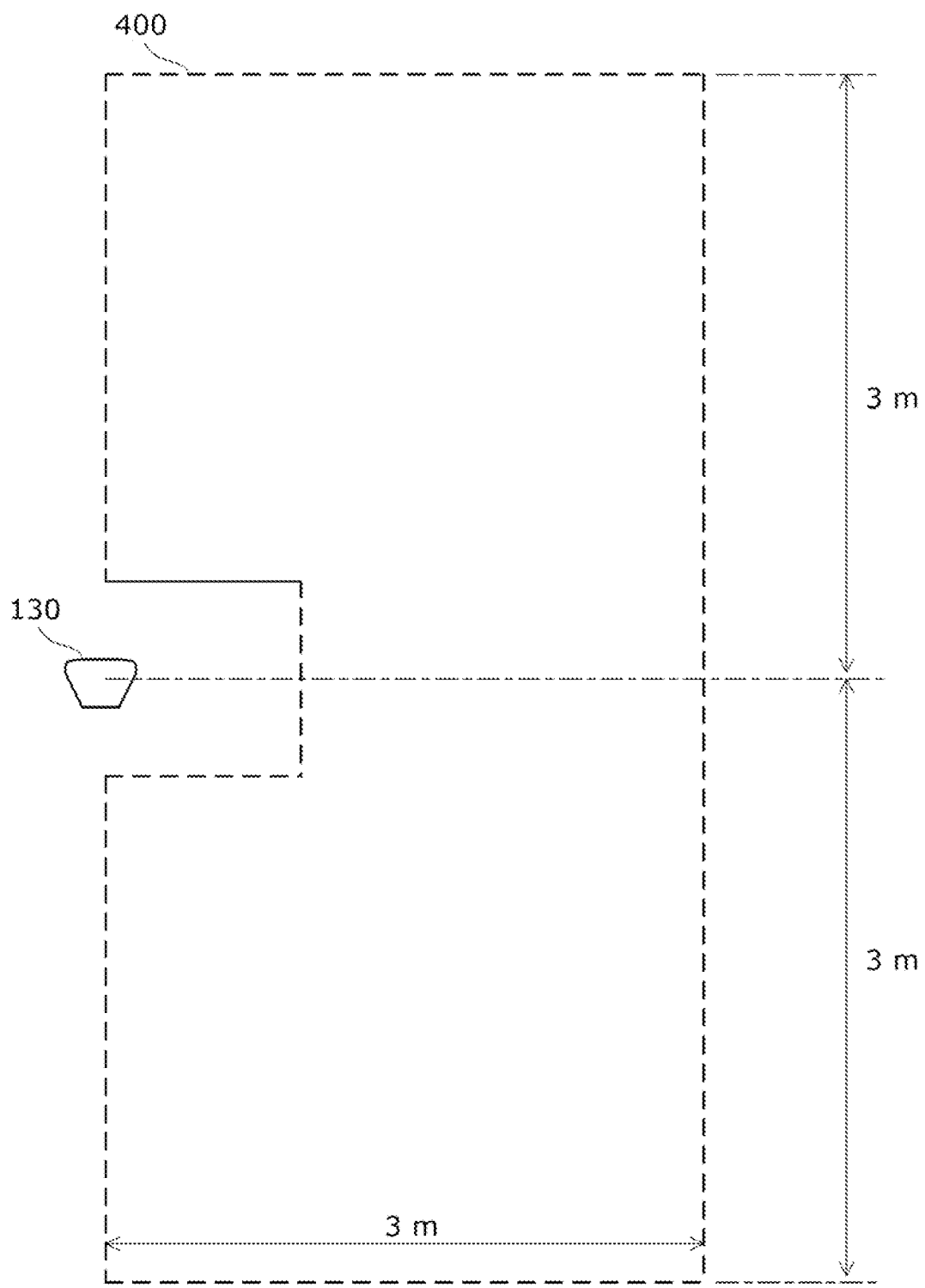
FIG. 4 illustrates the area around the duct that is the subject of the sound propagation simulation of noise generated by the unmanned aircraft.

FIG. 4 illustrates the area around the duct that is the subject of sound propagation simulation of noise generated by the unmanned aircraft.

As illustrated in FIG. 4, sound propagation simulation was performed for noise generated by a generator 110 shrouded by one duct 130 of unmanned aircraft 100 according to this embodiment, in outer area 400 which is defined based on the one duct 130. Outer area 400 extends 3 meters (m) outward, 3 m upward, and 3 m downward of unmanned aircraft 100 from generator 110.

Figure 5:
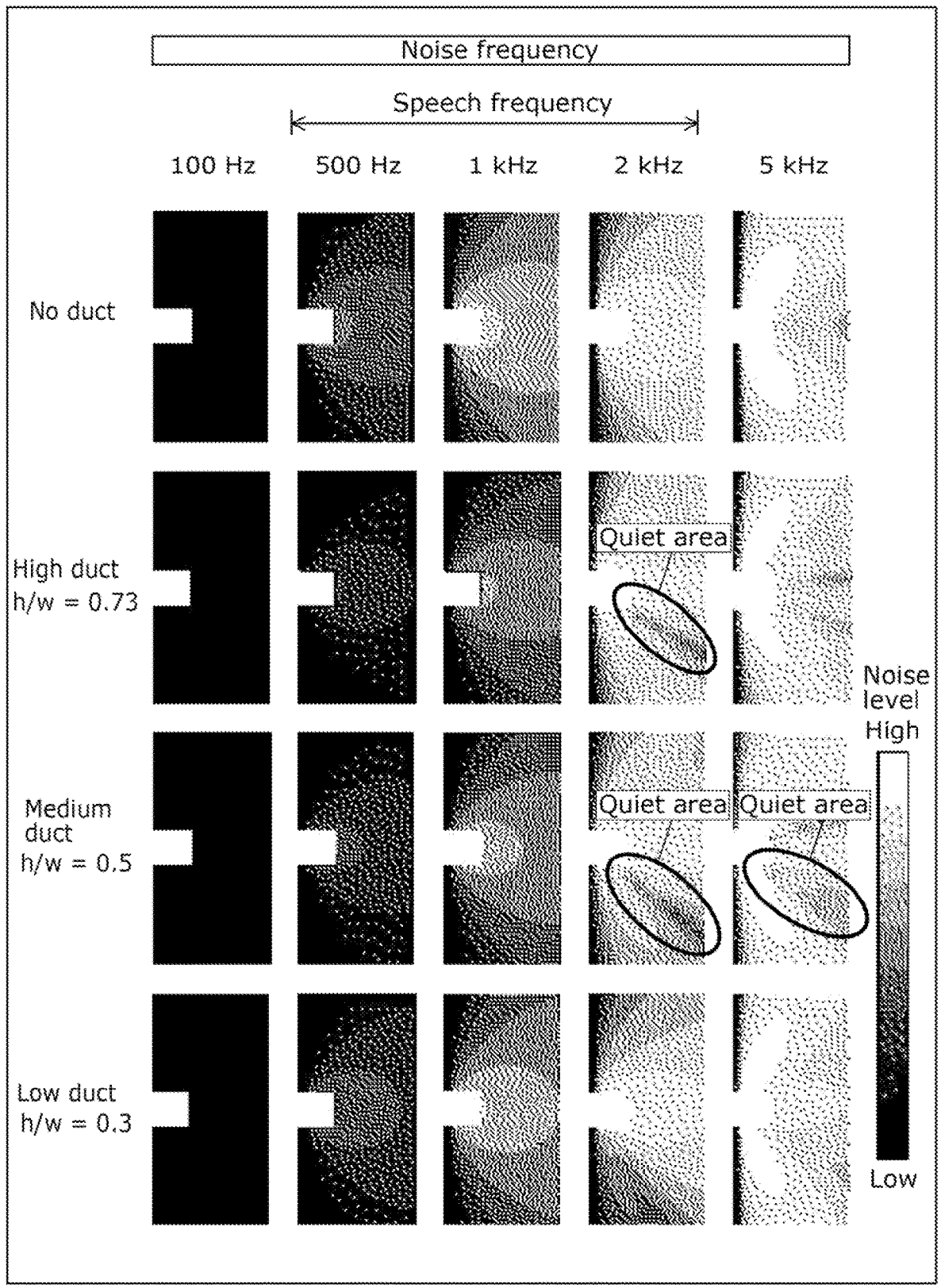
FIG. 5 illustrates results of sound propagation simulations performed with and without a duct having a 140 mm wide inner space.

FIG. 5 illustrates results of sound propagation simulations performed with and without a duct having a 140 mm wide inner space 131. More specifically, FIG. 5 illustrates distributions of noise levels in outer area 400 resulting from sound propagation simulations performed with and without a duct having a 140 mm wide inner space 131, with parameters set for noise frequency and duct geometry. Sound propagation simulations were performed for noise frequencies of 100 Hertz (Hz), 500 Hz, 1 kilohertz (kHz), 2 kHz, and 5 kHz. For each of the frequencies, sound propagation simulations were performed with duct geometry parameters set to no duct, high duct, medium duct, and low duct. High duct refers to duct 130 having an inner space 131 with a ratio h/w of 0.73, medium duct refers to duct 130 having an inner space 131 with a ratio h/w of 0.5, and low duct refers to duct 130 having an inner space 131 with a ratio h/w of 0.3.

As illustrated by the results of the sound propagation simulations in FIG. 5, a quiet area in which the noise level generated by rotor blades 111 is lower than other areas is formed around duct 130 in the sound propagation simulation performed with a duct having a 140 mm wide inner space 131, the noise frequency set to 2 kHz, and the duct geometry set to high duct, the sound propagation simulation performed with a duct having a 140 mm wide inner space 131, the noise frequency set to 2 kHz, and the duct geometry set to medium duct, and the sound propagation simulation performed with a duct having a 140 mm wide inner space 131, the noise frequency set to 5 kHz, and the duct geometry set to medium duct. The results also show that the quiet areas extend from the duct diagonally downward and away from unmanned aircraft 100. Although the quiet areas are illustrated as cross sections through the central axis of the duct (i.e., the generator) in FIG. 5, in reality, the quiet areas are three-dimensional spaces around the duct. In other words, the quiet areas extend diagonally downward and away from unmanned aircraft 100 and extend 360 degrees around unmanned aircraft 100 so as to follow an approximately conical surface.

Figure 6:
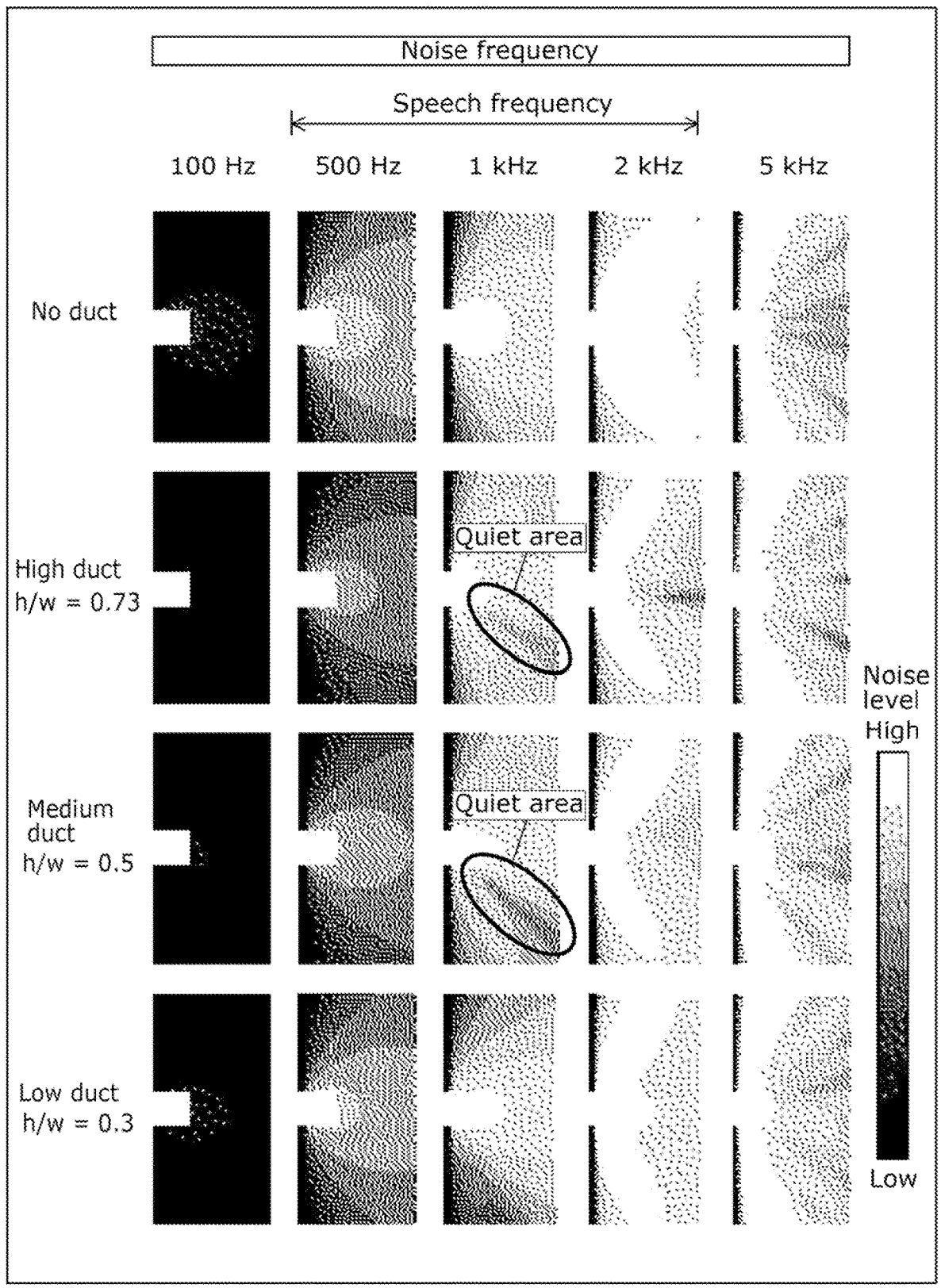
FIG. 6 illustrates results of sound propagation simulations performed with and without a duct having a 280 mm wide inner space.

FIG. 6 illustrates results of sound propagation simulations performed with and without a duct having a 280 mm wide inner space 131. More specifically, FIG. 6 illustrates distributions of noise levels in outer area 400 resulting from sound propagation simulations performed with and without a duct having a 280 mm wide inner space 131, with parameters set for noise frequency and duct geometry. Sound propagation simulations were performed for noise frequencies of 100 Hz, 500 Hz, 1 kHz, 2 kHz, and 5 kHz here as well. For each of the frequencies, sound propagation simulations were performed with duct geometry parameters set to no duct, high duct, medium duct, and low duct.

As illustrated by the results of the sound propagation simulations in FIG. 6, a quiet area in which the noise level generated by rotor blades 111 is lower than other areas is formed around duct 130 in the sound propagation simulation performed with a duct having a 280 mm wide inner space 131, the noise frequency set to 1 kHz, and the duct geometry set to high duct, and the sound propagation simulation performed with a duct having a 280 mm wide inner space 131, the noise frequency set to 1 kHz, and the duct geometry set to medium duct.

Thus, the results of the sound propagation simulations show that ducts having an inner space 131 with a ratio h/w of at least 0.5 produce a quiet area.

Figure 7:
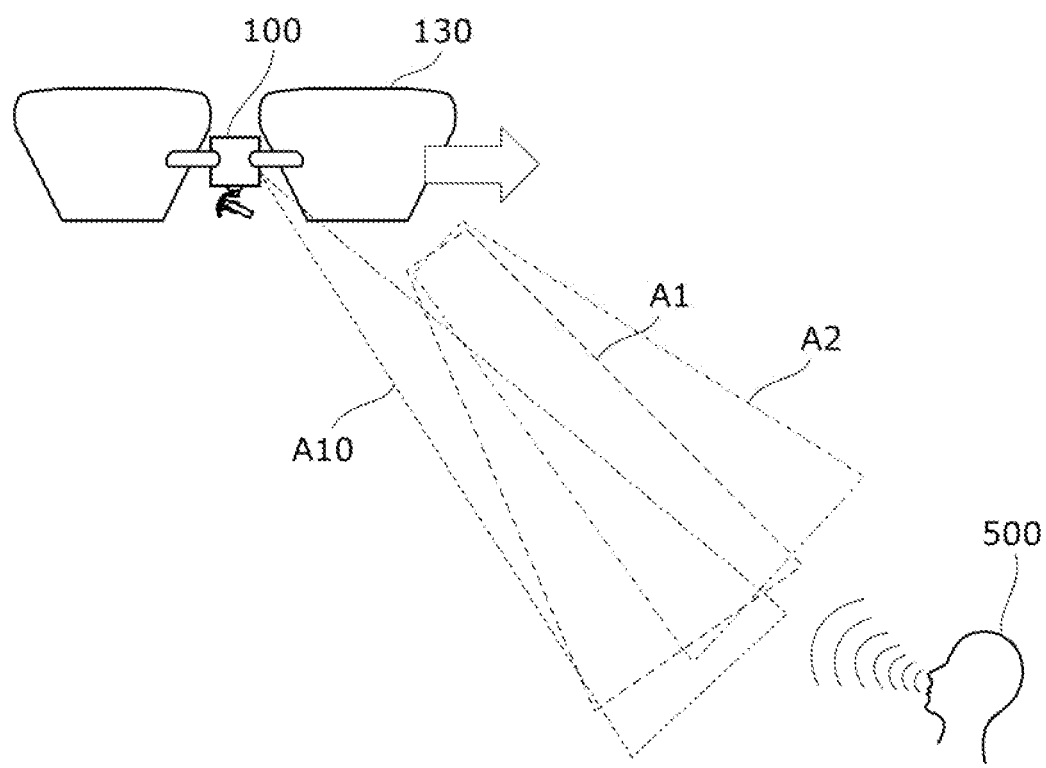
FIG. 7 schematically illustrates quiet areas around the duct in the unmanned aircraft having a medium duct geometry and a 140 mm wide inner space.

FIG. 7 schematically illustrates quiet areas around duct 130 in unmanned aircraft 100 having a medium duct geometry and a 140 mm wide inner space 131.

As illustrated in FIG. 7, around duct 130, quiet area A1 is formed at a frequency of 2 kHz and quiet area A2 is formed at a frequency of 5 kHz. Quiet areas A1 and A2 extend diagonally downward and away from duct 130. This is shown by the simulation results for noise frequencies of 2 kHz and 5 kHz when the duct geometry is set to medium duct in FIG. 5. Quiet area A1 is angled closer to the vertical direction than quiet area A2, and quiet area A2 is angled closer to the horizontal direction than quiet area A1. This shows that quiet areas are formed in different areas depending on the frequency of the noise.

Figure 8:
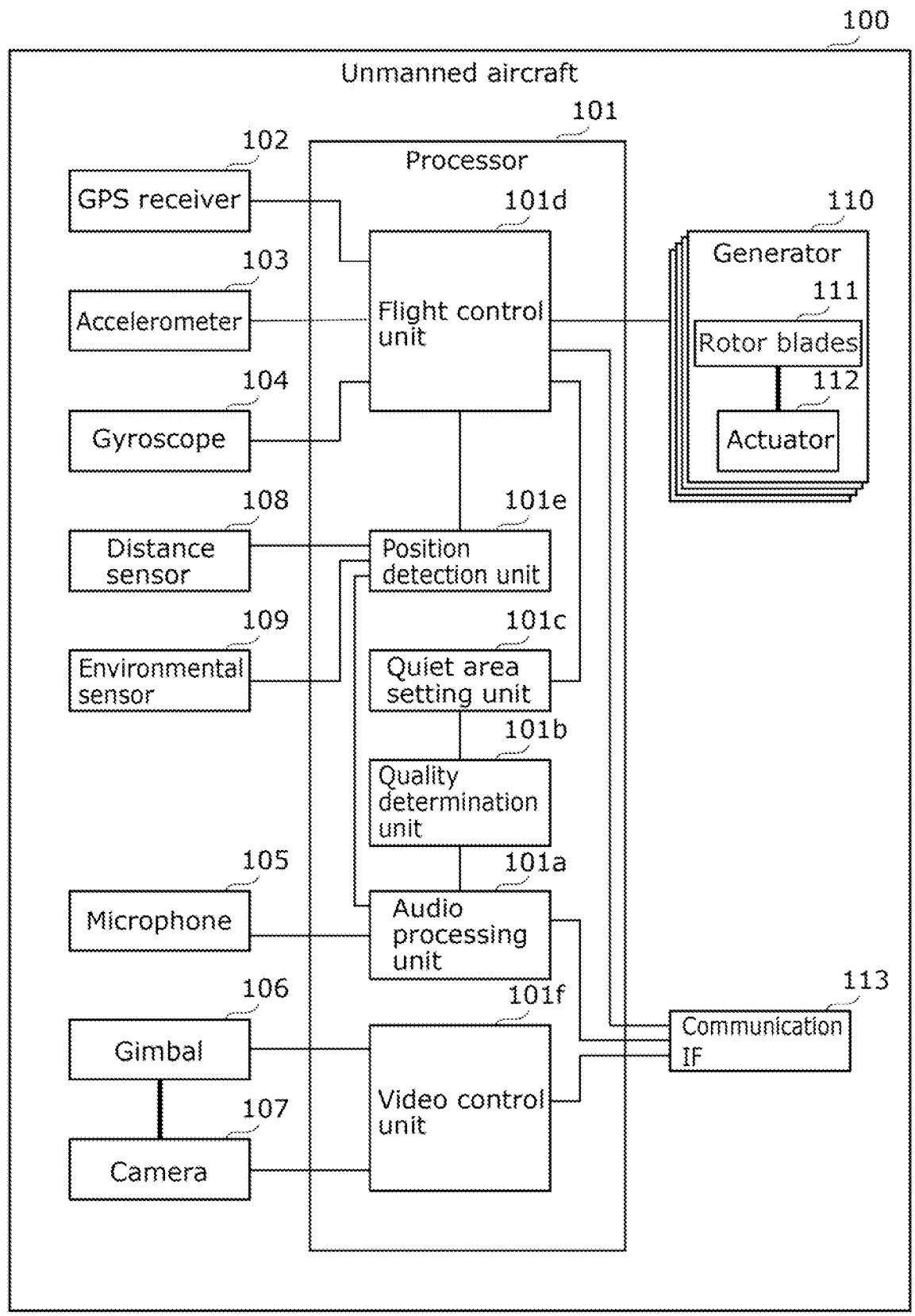
FIG. 8 is a block diagram illustrating a configuration of an unmanned aircraft according to an embodiment of the present disclosure.

FIG. 8 is a block diagram illustrating a configuration of an unmanned aircraft according to an embodiment of the present disclosure. More specifically, FIG. 8 is a block diagram for explaining the functions performed by processor 101 that is included in unmanned aircraft 100 and implemented as hardware.

As illustrated in FIG. 8, unmanned aircraft 100 includes processor 101, global positioning system (GPS) receiver 102, accelerometer 103, gyroscope 104, microphone 105, gimbal 106, camera 107, distance sensor 108, environmental sensor 109, four generators 110, and communication interface (IF) 113.

Processor 101 obtains detection results from various sensors including accelerometer 103, gyroscope 104, microphone 105, the image sensor included in camera 107, distance sensor 108, and environmental sensor 109, and reception results from GPS receiver 102 or communication IF 113, and performs various processing on the obtained detection results and reception results by executing a given program stored in memory or storage not shown in the figure. With this, processor 101 controls at least one of: the four generators 110; gimbal 106; and camera 107.

GPS receiver 102 receives information indicating a position of GPS receiver 102 from satellites including GPS satellites. In other words, GPS receiver 102 detects the current position of unmanned aircraft 100. Note that the satellites transmitting the information to be received by GPS receiver 107 are not limited to GPS satellites and may be satellites that support global navigation satellite system (GNSS).

Accelerometer 103 is a sensor that detects acceleration acting on unmanned aircraft 100 in three different directions. The three different directions may be orthogonal to one another.

Gyroscope 104 is a sensor that detects the angular velocity of unmanned aircraft 100 around three axes corresponding to the three different directions.

Microphone 105 is a microphone having directivity characteristics that allow it to pick up a higher quality of sound in a sound pickup area, which is defined as an area of a given angular range relative to a specific direction, than in areas outside the angular range of the sound pickup area. Microphone 105 is one example of a sound processing device that performs sound pickup processing, which is one example of sound processing for a sound source that is a sound processing target. The given angular range is, for example, an angular range of 90 degrees or less, and is a three-dimensional angular range that expands from the position of microphone 105. Microphone 105 may be a microphone array including a plurality of microphone elements. Microphone 105 generates audio data by recording sound, and outputs the generated audio data.

Gimbal 106 is a device for maintaining camera 107 at a constant attitude about three axes. In other words, gimbal 106 is a device for maintaining camera 107 at, for example, a desired attitude relative to a global coordinate system, even if the attitude of unmanned aircraft 100 changes. As used herein, a desired attitude refers to an attitude determined by the image capturing direction of camera 107 indicated in the operation signal received from controller 200.

Camera 107 is a device including an optical system, such as a lens, and an image sensor. Camera 107 is one example of a sensor.

Distance sensor 108 is a sensor that detects the distance between distance sensor 108 and a surrounding object. Examples of distance sensor 108 include an ultrasonic sensor, a time of flight (TOF) camera, and a light detection and ranging (LIDAR) sensor.

Environmental sensor 109 is, for example, a device including an image sensor, such as a camera. Unmanned aircraft 100 need not include environmental sensor 109; camera 107 may perform the functions of environmental sensor 109.

As the four generators 110 have already been described above, repeated description will be omitted.

Communication IF 113 is a communication interface that communicates with controller 200 or mobile terminal 300. Communication IF 113 includes, for example, a communication interface for receiving transmission signals emitted by controller 200. Communication IF 113 may be a communication interface for wireless communication with mobile terminal 300, i.e., a wireless local area network (LAN) interface conforming to the IEEE 802.11a, b, g, n, ac, and ax standards, for example. Communication IF 113 may be a communication interface that communicates with some other device such as a camera. In such cases, communication IF 113 may be, for example, a wired communication interface using universal serial bus (USB) technology or the like.

Processor 101 functions as a plurality of functional blocks by executing a program stored in memory not shown in the figure. For example, processor 101 includes, as functional blocks, audio processing unit 101a, quality determination unit 101b, quiet area setting unit 101c, flight control unit 101d, position detection unit 101e, and video control unit 101f as functional blocks.

Audio processing unit 101a obtains audio data generated by microphone 105 recording sound. Audio processing unit 101a may reduce noise included in the audio data by, for example, performing given sound processing on the obtained audio data that filters sound components in a given frequency range. The sound components in given frequency range are, for example, sound components in a frequency range corresponding to noise generated by the rotation of rotor blades 111 of generator 110.

Quality determination unit 101b uses the audio data generated by microphone 105 to determine the quality of the target sound included in the audio data. More specifically, quality determination unit 101b determines the quality of the target sound by determining the SN ratio of the target sound. For example, quality determination unit 101b may determine whether the SN ratio, which is one example of an indicator of quality, is higher than a threshold value, and determine that the quality is high if the SN ratio is higher than the threshold value and low if the SN ratio is less than the threshold value. For example, the SN ratio is calculated as the ratio of sound recorded with a target sound present to sound recorded without any target sound present. The SN ratio is, for example, the difference between the sound pressure level of the signal obtained by microphone 105 recording sound generated by unmanned aircraft 100 flying prior to noise reduction, and the sound pressure level of a target sound recorded by microphone 105 after noise reduction.

Quiet area setting unit 101c sets a quiet area that is dependent on the ratio h/w of duct 130 included in unmanned aircraft 100 and based on the noise generated by the rotation of rotor blades 111. More specifically, quiet area setting unit 101c may obtain the ratio h/w of duct 130 and target sound characteristic information, and identify the quiet area according to the obtained ratio h/w and target sound characteristic information. The target sound characteristic information includes a characteristic of a sound emitted by a sound source or sound correlation information correlated with the characteristic of the sound. The characteristic of a sound emitted by a sound source is, for example, the frequency of a sound emitted by a sound source. For example, when the sound source is a person, the sound correlation information is, for example, the gender and age of the person. When the sound source is, for example, an animal, the sound correlation information may be the type of animal.

For example, quiet area setting unit 101c may set the quiet area to an area that is dependent on the ratio h/w of duct 130 and the target sound characteristic information. Here, the area dependent on the target sound characteristic information may be identified for each different item of target sound characteristic information by, for example, performing sound propagation simulation as described above or calibration in advance. In other words, information indicating areas dependent on the target sound characteristic information may be stored in memory (not shown in the drawings) included in unmanned aircraft 100, and quiet area setting unit 101c may set the quiet area by reading the information indicating the areas dependent on the target sound characteristic information from the memory. The target sound characteristic information of a sound source may be identified by sound processing the audio data generated by microphone 105, or by image processing the video captured by camera 107.

Quiet area setting unit 101c may obtain the ratio h/w of duct 130 and noise characteristic information, and identify the quiet area according to the obtained ratio h/w and noise characteristic information. The noise characteristic information includes a characteristic of a first noise generated by the rotation of rotor blades 111 of generator 110 or noise correlation information correlated with the characteristic of the first noise. The characteristic of the first noise is, for example, the frequency of the first noise. The noise correlation information is, for example, the rotational speed of rotor blades 111.

For example, quiet area setting unit 101c may set the quiet area by reading from the memory a quiet area set in advance according to the ratio h/w of duct 130 and the noise characteristic information. Here, the area dependent on the noise characteristic information may be identified for each different item of noise characteristic information by, for example, performing sound propagation simulation as described above or calibration in advance. In other words, information indicating areas dependent on the noise characteristic information may be stored in the memory, and quiet area setting unit 101c may set the quiet area by reading the information indicating the areas dependent on the noise characteristic information from the memory. The noise characteristic information may be identified by obtaining instructions for the rotation to rotor blades 111.

Position detection unit 101e obtains the position of a sound source to be recorded by microphone 105, i.e., a sound recording target of microphone 105. Position detection unit 101e detects the position of the sound source of a target sound relative to unmanned aircraft 100 using the audio data generated by microphone 105. The position detection unit 101e may determine the sound source direction, which is the direction from unmanned aircraft 100 to the sound source of a target sound, to be a direction in which the sound pressure of the target sound is estimated to be high by comparing data included in the audio data from respective microphone elements of microphone 105.

Position detection unit 101e may determine the sound source direction using image data generated by the image sensor of camera 107. In such cases, position detection unit 101e may identify the sound source direction or estimate the distance to the sound source by recognizing a predetermined color, shape, type, etc., of the sound source by image processing the image data.

When the sound source direction is identified, position detection unit 101e may estimate the distance to the sound source by detecting the distance to an object in the sound source direction using distance sensor 108. Position detection unit 101e may obtain the magnitude (e.g., the sound pressure) of the target sound emitted from the sound source, and estimate the distance to the sound source by comparing the magnitude of the target sound included in the audio data generated by microphone 105 with the magnitude of the obtained target sound. In such cases, the magnitude of the target sound emitted from the sound source may be a predetermined magnitude. Position detection unit 101e may also identify the sound source direction or the position of the sound source by obtaining information indicating the position of the sound source from the sound source or an external device.

For example, the sound source may be a person, an animal, a loudspeaker, or a vehicle.

Flight control unit 101d controls the flight state of unmanned aircraft 100 by controlling the rotational speed of actuators 112 of generators 110 in accordance with the current position of unmanned aircraft 100 detected by GPS receiver 102, the flight speed and the flight attitude of unmanned aircraft 100 obtained from the detection results from accelerometer 103 and gyroscope 104, and the operation signal received by communication IF 113 from controller 200. In other words, flight control unit 101d controls the flight state of unmanned aircraft 100 in response to operation of controller 200 by the user.

Flight control unit 101d controls at least one of the position and the attitude of unmanned aircraft 100 so as to include the position of the sound source detected by position detection unit 101e in the quiet area set by quiet area setting unit 101c. When, for example, as illustrated in FIG. 7, sound source 500 is located farther from unmanned aircraft 100 than quiet areas A1 and A2 of unmanned aircraft 100, flight control unit 101d causes unmanned aircraft 100 to fly closer to sound source 500 so as to include the position of sound source 500 in quiet areas A1 and A2. When, for example, sound source 500 is located closer to unmanned aircraft 100 than quiet areas A1 and A2 of unmanned aircraft 100, flight control unit 101d causes unmanned aircraft 100 to fly away from sound source 500 so as to include the position of sound source 500 in quiet areas A1 and A2.

Since this allows quiet areas A1 and A2 to overlap sound source 500 by controlling at least one of the position and the attitude of the unmanned aircraft 100, the influence of noise generated by unmanned aircraft 100 on the recorded sound can be effectively reduced. Moreover, when sound source 500 is a person, unmanned aircraft 100 can reduce the level of noise emitted to the person by causing quiet areas A1 and A2 to overlap the person. It is therefore possible to reduce discomfort or fear felt by the person from unmanned aircraft 100.

Flight control unit 101d may control at least one of the position and the attitude of the unmanned aircraft 100 so as to include sound source 500 in quiet areas A1 and A2 while moving unmanned aircraft 100 based on movement instructions for unmanned aircraft 100. For example, in cases in which sound source 500 is also moving while unmanned aircraft 100 is being moved according to the movement instructions, flight control unit 101d may correct the movement of unmanned aircraft 100 so that quiet areas A1 and A2 track the movement of sound source 500 to compensate for differences in positions between quiet areas A1 and A2 and sound source 500 resulting from the movement of unmanned aircraft 100 and the movement of sound source 500. This makes it easy to move unmanned aircraft 100 while keeping quiet areas A1 and A2 overlapped with sound source 500, even when sound source 500 is moving. Note that flight control unit 101d obtains the movement instructions for unmanned aircraft 100 from controller 200 via communication IF 113.

Microphone 105 may include a mechanism that can change at least one of the position and the attitude of microphone 105. In such cases, the sound pickup direction of microphone 105 may be set to a direction toward the quiet area set by quiet area setting unit 101c, by changing at least one of the position and the attitude of microphone 105 using the mechanism. This causes sound pickup area A10 of microphone 105 to overlap quiet areas A1 and A2, as illustrated in, for example, FIG. 7. Moreover, since at least one of the position and the attitude of unmanned aircraft 100 is controlled by flight control unit 101d so as to include the position of the sound source in the quiet area, unmanned aircraft 100 can be controlled so as to include sound source 500 in sound pickup area A10 of microphone 105. Note that a direction toward the quiet area refers to a direction from the position of microphone 105 toward quiet areas A1 and A2 formed around duct 130.

Since this enables the recording of sound from quiet areas A1 and A2 using microphone 105, the influence of noise generated by unmanned aircraft 100 on the recorded sound can be reduced. The target sound can therefore be recorded with sufficiently high quality.

Even when microphone 105 does not include the mechanism described above, microphone 105 may be fixed to unmanned aircraft 100 such that the sound pickup direction of microphone 105 is fixedly directed toward quiet areas A1 and A2.

Note that in addition to the sound pickup direction of microphone 105, the image capturing direction of camera 107 may also be set to a direction toward quiet areas A1 and A2 of unmanned aircraft 100 by changing at least one of the position and the attitude of camera 107 using gimbal 106. This makes it possible to cause both the sound pickup area of microphone 105 and the image capturing area of camera 107 to overlap quiet areas A1 and A2. Even when camera 107 does not include gimbal 106, camera 107 may be fixed to unmanned aircraft 100 such that the image capturing direction of camera 107 is fixedly directed toward quiet areas A1 and A2.

Note that information indicating the region that sound pickup area A10 of microphone 105 is in relative to unmanned aircraft 100 is stored in advance in memory (not illustrated) included in unmanned aircraft 100. Accordingly, quality determination unit 101b, which determines the amount of change to the attitude of unmanned aircraft 100 by flight control unit 101d, can determine an amount of change indicating how much unmanned aircraft 100 needs to be moved or rotated to include sound source 500 in sound pickup area A10, based on the information on sound pickup area A10 read from memory and the position of sound source 500 relative to unmanned aircraft 100 obtained by position detection unit 101e.

The regions that quiet area A1 and A2 are in relative to unmanned aircraft 100 are indicated in information read from memory by quiet area setting unit 101c. Therefore, even when the flight of unmanned aircraft 100 is controlled with reference to quiet areas A1 and A2, just like with sound pickup area A10, it is possible to determine an amount of change indicating how much unmanned aircraft 100 needs to be moved to include sound source 500 in sound pickup area A10 based on quiet areas A1 and A2 identified by the information read from memory and the position of sound source 500 relative to unmanned aircraft 100 obtained by position detection unit 101e.

Video control unit 101f controls the attitude of camera 107 by controlling gimbal 106 in accordance with the operation signal received by communication IF 113 so that the image capturing direction of camera 107 matches the direction indicated by the operation signal. In addition, video control unit 101f may perform given image processing on the image data captured by camera 107. Video control unit 101f may transmit the image data obtained from camera 107 or the image data processed via the given image processing to mobile terminal 300 via communication IF 113.

[Operations]

Figure 9:
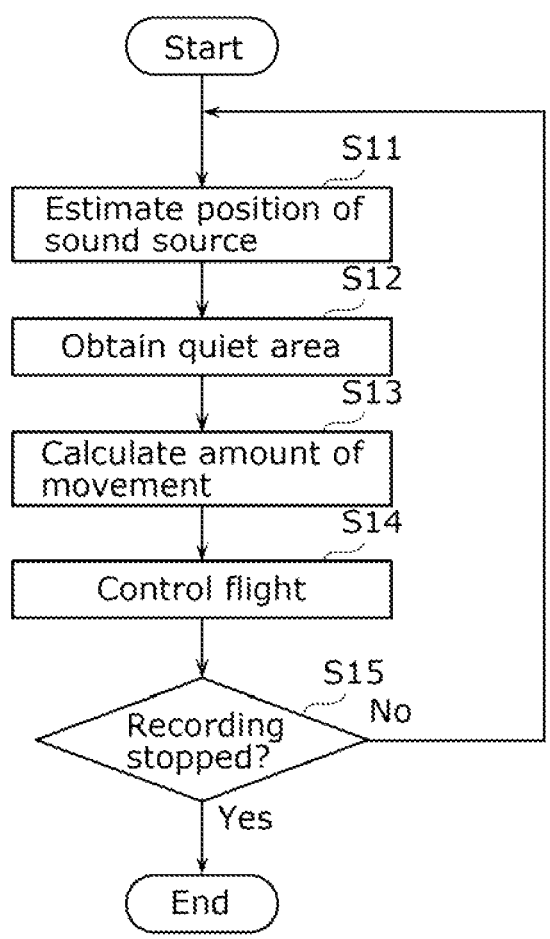
FIG. 9 is a flowchart of a first example of operations performed by the unmanned aircraft.

Next, a first example of operations performed by unmanned aircraft 100 will be described. FIG. 9 is a flowchart of the first example of operations performed by the unmanned aircraft. More specifically, the operations performed by unmanned aircraft 100 are performed by processor 101.

First, when sound recording by unmanned aircraft 100 is started in response to communication IF 113 receiving a control signal from controller 200, position detection unit 101e estimates the position of sound source 500 relative to unmanned aircraft 100 (S11).

Next, quiet area setting unit 101c obtains a quiet area that is dependent on the ratio h/w of duct 130 included in unmanned aircraft 100 from memory, and sets the obtained quiet area (S12).

Next, flight control unit 101d calculates an amount of movement of unmanned aircraft 100 required to move the obtained quiet area of unmanned aircraft 100 to a relative position of sound source 500 (S13).

Flight control unit 101d then controls the flight of unmanned aircraft 100 by controlling the four generators 110 of unmanned aircraft 100 according to the calculated amount of movement (S14). Unmanned aircraft 100 is consequently moved to a position where the quiet area of unmanned aircraft 100 overlaps sound source 500.

Next, processor 101 determines whether communication IF 113 has received a control signal from controller 200 for stopping the sound recording control (S15). Processor 101 returns to step S11 if communication IF 113 has not received the control signal (No in S15). Processor 101 ends the operation if communication IF 113 has received the control signal (Yes in S15).

Figure 10:
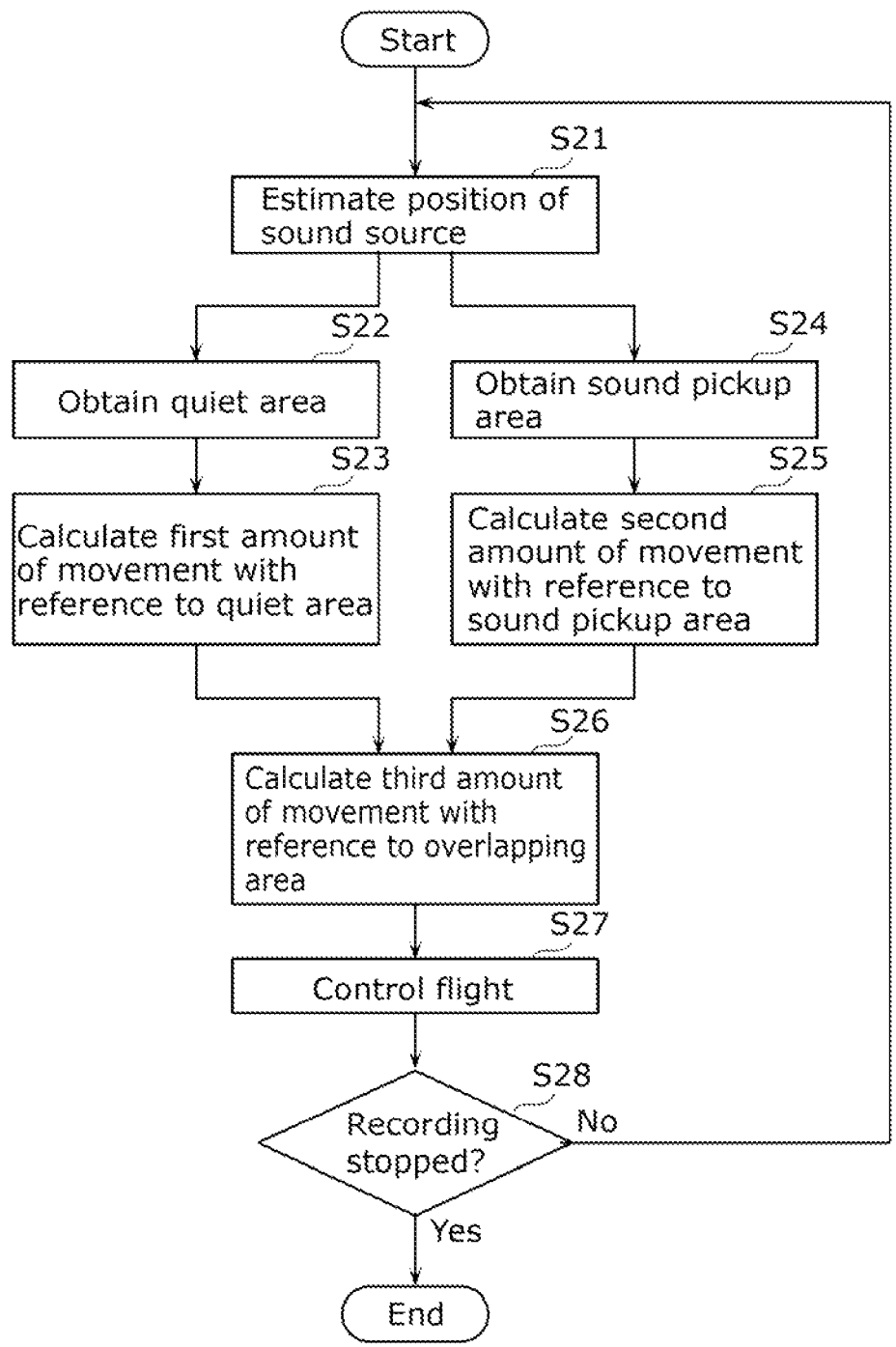
FIG. 10 is a flowchart of a second example of operations performed by the unmanned aircraft.

Unmanned aircraft 100 may operate as exemplified in a second example. FIG. 10 is a flowchart of the second example of operations performed by the unmanned aircraft.

First, when sound recording by unmanned aircraft 100 is started in response to communication IF 113 receiving a control signal from controller 200, position detection unit 101e estimates the position of sound source 500 relative to unmanned aircraft 100 (S21).

Next, quiet area setting unit 101c obtains a quiet area that is dependent on the ratio h/w of duct 130 included in unmanned aircraft 100 from memory, and sets the obtained quiet area (S22).

Next, flight control unit 101d calculates a first amount of movement of unmanned aircraft 100 required to move the obtained quiet area of unmanned aircraft 100 to a relative position of sound source 500 (S23). Here, the calculated first amount of movement is an amount of movement for positioning sound source 500 within the quiet area. The first amount of movement is specified by an amount of movement in a first range from a first lower limit to a first upper limit.

In parallel with steps S22 and S23, processor 101 obtains a sound pickup area of microphone 105 (S24).

Next, flight control unit 101d calculates a second amount of movement of unmanned aircraft 100 required to move the obtained sound pickup area of unmanned aircraft 100 to a relative position of sound source 500 (S25). Here, the calculated second amount of movement is an amount of movement for positioning sound source 500 within the sound pickup area. The second amount of movement is specified by an amount of movement in a second range from a second lower limit to a second upper limit.

Flight control unit 101d then calculates a third amount of movement with reference to an overlapping area where the first range of the calculated first amount of movement and the second range of the calculated second amount of movement overlap (S26). More specifically, flight control unit 101d calculates a third amount of movement of unmanned aircraft 100 for positioning sound source 500 within the overlapping area (S26).

Flight control unit 101d then controls the flight of unmanned aircraft 100 by controlling the four generators 110 of unmanned aircraft 100 according to the calculated third amount of movement (S27). Unmanned aircraft 100 is consequently moved to a position where sound source 500 overlaps the overlapping area, which is the area of overlap of the quiet area and the sound pickup area of unmanned aircraft 100.

Next, processor 101 determines whether communication IF 113 has received a control signal from controller 200 for stopping the sound recording control (S28). Processor 101 returns to step S21 if communication IF 113 has not received the control signal (No in S28). Processor 101 ends the operation if communication IF 113 has received the control signal (Yes in S28).

[Advantageous Effects, Etc.]

Unmanned aircraft 100 according to the this embodiment includes: rotor blades 111; duct 130 that shrouds rotor blades 111 and through which airflow generated by rotation of rotor blades 111 passes; and processor 101 that controls rotation of rotor blades 111. The ratio (h/w) of the height (h) to the width (w) of inner space 131 of duct 130 in which rotor blades 111 are shrouded is at least 0.5.

With this, since rotor blades 111 of unmanned aircraft 100 are shrouded by duct 130 including inner space 131 having a height (h) to width (w) ratio (h/w) of at least 0.5, quiet area A1 in which the noise level generated by rotor blades 111 is lower than other areas can be formed around duct 130. Unmanned aircraft 100 can therefore obtain sufficiently high quality sound processing results because unmanned aircraft 100 can reduce the influence of noise generated by unmanned aircraft 100 on the recorded sound by executing the sound pickup processing of microphone 105 using quiet area A1. Moreover, when the sound source, i.e., the sound recording target is a person, unmanned aircraft 100 can reduce the level of noise emitted to the person by executing the sound pickup processing using quiet area A1. It is therefore possible to reduce discomfort or fear felt by the person when using unmanned aircraft 100 to execute the sound pickup processing with respect to a person. In this way, unmanned aircraft 100 can directly reduce the influence of noise generated by unmanned aircraft 100 on the sound processing target, one example of which is a person.

In unmanned aircraft 100, the width (w) of the inner space is at least 140 mm and at most 280 mm. With this, since rotor blades 111 of unmanned aircraft 100 are shrouded by duct 130 including inner space 131 having a width (w) that is at least 140 mm and at most 280 mm and a height (w) to width (w) ratio (h/w) of at least 0.5, quiet area A1 in which the noise level generated by rotor blades 111 is lower than other areas can be formed around duct 130.

[Variations]

(1)

Although the sound processing device included in unmanned aircraft 100 according to the above embodiment is exemplified as microphone 105, the sound processing device may be a loudspeaker. When the sound processing device is a loudspeaker, the sound processing target of the loudspeaker is the sound output target to which the speaker outputs sound, one example of which is a person. When the sound processing device is a loudspeaker, the sound output direction of the loudspeaker may be set to a direction from the loudspeaker toward quiet areas A1 and A2. Processor 101 may thus perform sound output processing as the sound processing related to the sound processing device based on quiet areas A1 and A2, which are dependent on the ratio h/w of duct 130.

Since this enables sound to be output from the loudspeaker toward quiet areas A1 and A2, the influence of noise generated by unmanned aircraft 100 on the sound output by the loudspeaker can be reduced. Sound can therefore be output from the loudspeaker to a person with sufficiently high quality.

When the sound processing device of unmanned aircraft 100 is a loudspeaker and the sound processing target is a sound output target, processor 101 may control the loudspeaker to output sound for active noise control (ANC). For example, processor 101 may obtain a characteristic of a second noise coming from the position of the sound output target and cause the loudspeaker to output, toward the quiet area, sound that reduces the second noise based on the characteristic of the second noise. In this way, it is possible for unmanned aircraft 100 to reduce the influence of noise generated by unmanned aircraft 100 on the sound output from the loudspeaker by outputting, from the loudspeaker toward the quiet area, sound that reduces the second noise coming from the position of the sound output target. Therefore, the second noise coming from the position of the sound output target can be effectively reduced. The characteristic of the second noise may be obtained based on audio data obtained by a microphone positioned at the sound output target and, alternatively, may be obtained by estimating noise coming from the position of the sound output target using microphone 105 included in unmanned aircraft 100. When a microphone positioned at the sound output target is used, if the sound output target is a person, a mobile terminal such as a smartphone carried by the person may obtain the second noise, and unmanned aircraft 100 may obtain the characteristic of the second noise from the mobile terminal via wireless communication.

(2)

Figure 11:
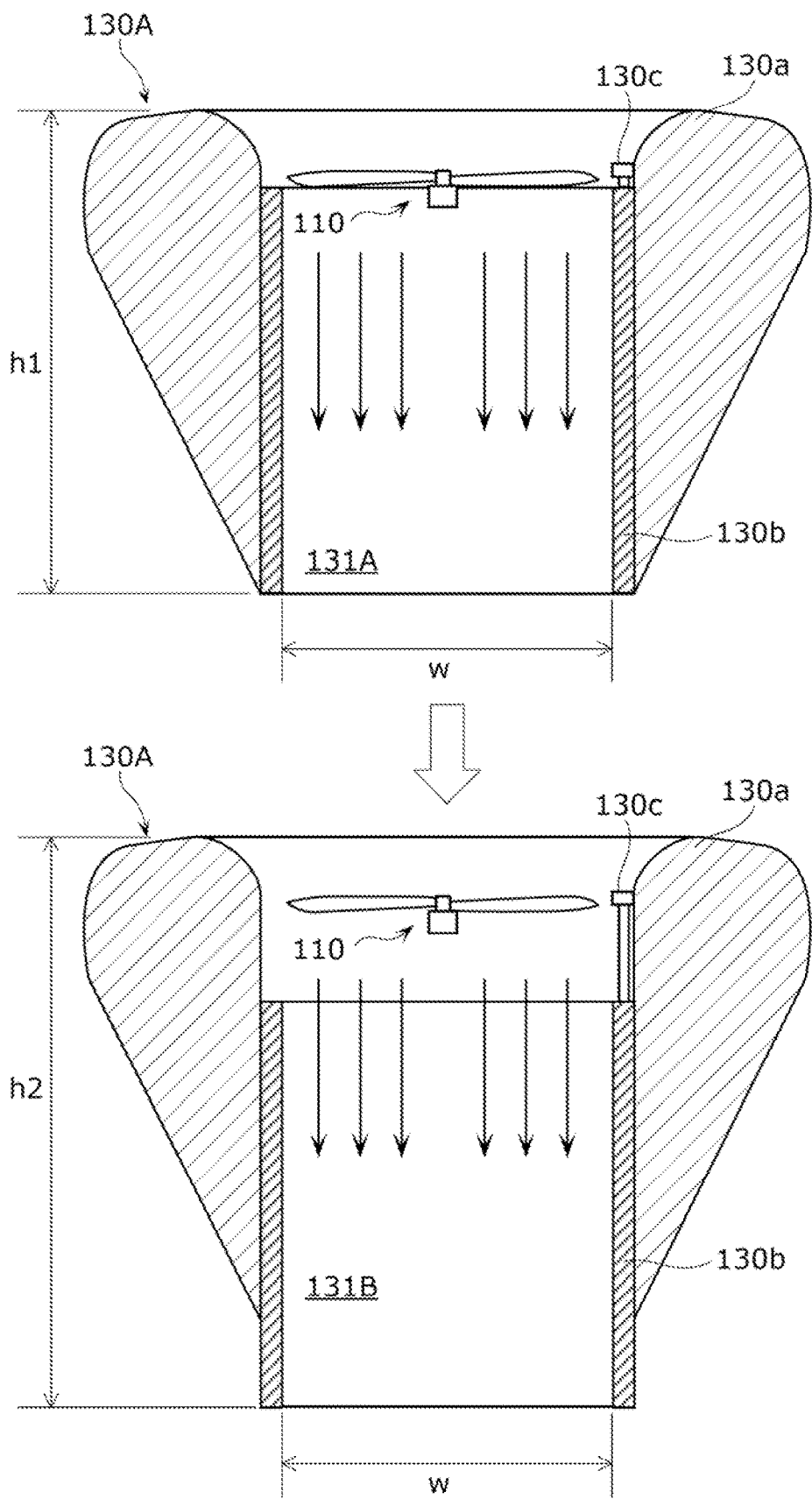
FIG. 11 illustrates a cross section of a variation of the unmanned aircraft taken along line III-III in FIG. 2.

Unmanned aircraft 100 according to the above embodiment may include duct 130A whose ratio is adjustable. In such cases, unmanned aircraft 100 may include mechanism 130c that adjusts the ratio h1/w of duct 130A, as illustrated in FIG. 11. Mechanism 130c that adjusts the ratio h1/w of duct 130A changes inner space 131A into inner space 131B by, for example, adjusting height h1 of inner space 131A of duct 130A to height h2 that is higher than height h1. This allows the ratio of duct 130A to be changed between the ratio h1/w and the ratio h2/w.

Specifically, duct 130A includes a tubular outer component 130a, a tubular inner component 130b along the inner surface of outer component 130a, and mechanism 130c on the inner surface of outer component 130a that pushes the upper end of inner component 130b downward or pulls the upper end of inner component 130b upward. Mechanism 130c may be implemented as, for example, a ball screw and a motor. The ball screw is screwed to inner component 130b, and the rotation of the motor pushes inner component 130b downward or pulls it upward. Mechanism 130c is not limited to a ball screw and a motor, and may be any mechanism capable of moving inner component 130b vertically relative to outer component 130a. Note that the height of duct 130A is preferably configured to extend downwardly because it allows for a quiet area to be formed diagonally downward and away from duct 130A.

In this way, since the sound processing related to the sound processing device is executed based on the quiet area that is dependent on the ratio of duct 130, it is possible to effectively reduce the influence of noise generated by unmanned aircraft 100 on the sound processing results.

(3)

In unmanned aircraft 100 according to the above embodiment, processor 101 controls one of the position and the attitude of unmanned aircraft 100 so as to include sound source 500 in quiet areas A1 and A2, but this example is non-limiting. Processor 101 may notify sound source 500 to enter quiet areas A1 and A2 of unmanned aircraft 100. For example, when sound source 500 is a person, processor 101 gives a notification prompting sound source 500 to approach unmanned aircraft 100 if sound source 500 is located farther from unmanned aircraft 100 than the quiet area of unmanned aircraft 100. Processor 101 gives a notification prompting sound source 500 to move away from unmanned aircraft 100 if sound source 500 is located closer to unmanned aircraft 100 than the quiet area of unmanned aircraft 100. The notification prompting sound source 500 may be given by audio, by projecting an arrow on the ground indicating a direction in which to move, by a message via a projector or the like (not illustrated) included in unmanned aircraft 100, or by transmitting information indicating the notification to a terminal carried by sound source 500.

(4)

In unmanned aircraft 100 according to the above embodiment, the influence of noise generated by unmanned aircraft 100 on sound processing results is reduced by causing the quiet area to overlap the sound processing target, but this example is non-limiting. For example, when unmanned aircraft 100 is capturing images of a person using camera 107, moving unmanned aircraft 100 to a position where the quiet area and the person overlap can also reduce the level of noise emitted to the person. Accordingly, it possible to reduce discomfort or fear felt by the person not only when using unmanned aircraft 100 to execute the sound processing with respect to a person, but also when using unmanned aircraft 100 to capture images.

Each of the elements in each of the above-described embodiments may be implemented as dedicated hardware, or may be realized by executing a software program suitable for the element. Each of the elements may be realized by way of a program executing unit, such as a CPU or a processor, reading and executing the software program recorded on a recording medium such as a hard disk or a semiconductor memory.

Hereinbefore, the unmanned aircraft according to one or more aspects of the present invention has been described based on an exemplary embodiment, but the present invention is not limited thereto. Various modifications of the exemplary embodiment that may be conceived by those skilled in the art as well as embodiments resulting from arbitrary combinations of elements of different exemplary embodiments are included within the scope of the one or more aspects of the present invention as long as they do not depart from the spirit of the present invention.

Note that machine learning may be utilized for processes performed by processor 101 and for image recognition processing and sound recognition processing. Examples of machine learning include: supervised learning in which an input-output relationship is learned by use of training data, which is input information labeled with output information; unsupervised learning in which the structure of data is built only from unlabeled input information; semi-supervised learning in which both labeled and unlabeled information are utilized; and reinforcement learning in which an agent receives feedback (a reward) for an action selected from the result of state observation, and consecutive actions that maximize the cumulative reward are learned. More specific techniques of machine learning include neural-network learning (including deep learning that utilizes a multi-layered neural network), genetic programming, decision tree learning, Bayesian network learning, and support vector machine (SVM) learning. The present disclosure may use any one of these exemplary techniques.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable as an unmanned aircraft and the like that can directly reduce the influence of noise generated by the unmanned aircraft on a sound processing target.

The invention claimed is:

1. An unmanned aircraft comprising:
rotor blades;
a duct that shrouds the rotor blades and through which airflow generated by rotation of the rotor blades passes; and
a processor that controls rotation of the rotor blades,
wherein a ratio of a height to a width of an inner space of the duct in which the rotor blades are shrouded is at least 0.5.

2. The unmanned aircraft according to claim 1,
wherein the width of the inner space is at least 140 mm and at most 280 mm.

3. The unmanned aircraft according to claim 1, further comprising:
a microphone or a loudspeaker,
wherein a sound pickup direction of the microphone or a sound output direction of the loudspeaker is set to a direction toward a quiet area, the quiet area being relative to a first noise generated by rotation of the rotor blades and dependent on the ratio.

4. The unmanned aircraft according to claim 1, further comprising:
a mechanism that adjusts the ratio of the duct.

5. The unmanned aircraft according to claim 4,
wherein the mechanism includes a mechanism that adjusts the height of the inner space of the duct.

6. The unmanned aircraft according to claim 1, further comprising:
a sound processing device,
wherein the processor executes sound processing related to the sound processing device based on a quiet area, the quiet area being relative to a first noise generated by rotation of the rotor blades and dependent on the ratio.

7. The unmanned aircraft according to claim 6,
wherein the processor:
obtains a position of a sound processing target of the sound processing device; and
controls at least one of a position and an attitude of the unmanned aircraft to include the sound processing target in the quiet area.

8. The unmanned aircraft according to claim 7,
wherein the sound processing device is a microphone,
the sound processing target is a sound source to be recorded by the microphone, and
the processor controls at least one of a position and an attitude of the microphone to include the sound source in a sound pickup area of the microphone and to cause the sound pickup area to overlap the quiet area.

9. The unmanned aircraft according to claim 6,
wherein the sound processing device is a microphone,
a sound processing target of the sound processing device is a sound source to be recorded by the microphone, and
the processor:
obtains target sound characteristic information including a characteristic of a sound generated by the sound source or sound correlation information correlated with a characteristic of the sound; and
identifies the quiet area according to the ratio and the target sound characteristic information.

10. The unmanned aircraft according to claim 6,
wherein the processor:
obtains noise characteristic information including a characteristic of the first noise or noise correlation information correlated with a characteristic of the first noise; and
identifies the quiet area according to the ratio and the noise characteristic information.

11. The unmanned aircraft according to claim 6,
wherein the processor:
obtains a position of a sound processing target of the sound processing device; and
notifies the sound processing target to enter the quiet area.

12. The unmanned aircraft according to claim 6,
wherein the processor:
obtains a position of a sound processing target of the sound processing device;
obtains a movement instruction for moving the unmanned aircraft; and
controls at least one of a position and an attitude of the unmanned aircraft to include the sound processing target of the sound processing device in the quiet area while moving the unmanned aircraft based on the movement instruction.

13. The unmanned aircraft according to claim 6,
wherein the sound processing device is a loudspeaker,
a sound processing target of the sound processing device is a sound output target, and
the processor:
obtains a characteristic of a second noise coming from a position of the sound output target; and
causes the loudspeaker to output, toward the quiet area, sound that reduces the second noise based on the characteristic of the second noise.

14. The unmanned aircraft according to claim 6, further comprising:
  a mechanism that adjusts the ratio,
  wherein the processor:
    obtains a position of a sound processing target of the sound processing device; and
    controls the mechanism to adjust the ratio to include the sound processing target in the quiet area.

\* \* \* \* \*